(12) United States Patent
Kumashiro

(10) Patent No.: US 10,009,871 B2
(45) Date of Patent: Jun. 26, 2018

(54) RADIO COMMUNICATION SYSTEM

(71) Applicant: JVC KENWOOD Corporation, Yokohama-shi, Kangawa (JP)

(72) Inventor: Hiroaki Kumashiro, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days. days.

(21) Appl. No.: 15/712,869

(22) Filed: Sep. 22, 2017

(65) Prior Publication Data
US 2018/0092058 A1   Mar. 29, 2018

(30) Foreign Application Priority Data

Sep. 26, 2016 (JP) ................................. 2016-186681

(51) Int. Cl.
| | | |
|---|---|---|
| *H04B 7/00* | (2006.01) | |
| *H04W 64/00* | (2009.01) | |
| *H04B 7/24* | (2006.01) | |
| *H04B 7/005* | (2006.01) | |

(52) U.S. Cl.
CPC .......... *H04W 64/003* (2013.01); *H04B 7/005* (2013.01); *H04B 7/24* (2013.01); *H04W 64/006* (2013.01)

(58) Field of Classification Search
USPC .................................................. 455/517–520
See application file for complete search history.

(56) References Cited

U.S. PATENT DOCUMENTS

| | | | | |
|---|---|---|---|---|
| 9,002,379 B1* | 4/2015 | Yang | ..................... | H04W 4/022 340/539.13 |
| 2002/0090954 A1* | 7/2002 | Tanaka | .................. | H04W 76/40 455/456.1 |
| 2002/0107008 A1* | 8/2002 | Hendrey | ............... | H04W 76/40 455/416 |
| 2011/0238755 A1* | 9/2011 | Khan | ..................... | H04W 4/21 709/204 |
| 2013/0324166 A1* | 12/2013 | Mian | ..................... | H04W 4/021 455/457 |
| 2017/0164318 A1* | 6/2017 | Smith | ................... | H04W 4/029 |
| 2017/0230799 A1* | 8/2017 | Wawrowski | .......... | H04W 4/029 |

FOREIGN PATENT DOCUMENTS

JP     H11-196029 A     7/1999

\* cited by examiner

*Primary Examiner* — Fayyaz Alam
(74) *Attorney, Agent, or Firm* — Nath, Goldberg & Meyer; Jerald L. Meyer

(57) ABSTRACT

A first radio device promotes formation of a temporary group. A second radio device responds to the promotion of the formation of the temporary group. The first radio device includes: a first position information calculator that calculates position information of the first radio device; and a position information transmission controller that controls to transmit the position information of the first radio device to the second radio device at a time of promoting the formation of the temporary group. The second radio device includes: a second position information calculator that calculates position information of the second radio device; a distance calculator that calculates a distance between the first and second radio devices; and a temporary group participation controller that controls to participate in the temporary group when the distance between the first and second radio devices is within a predetermined distance.

7 Claims, 18 Drawing Sheets

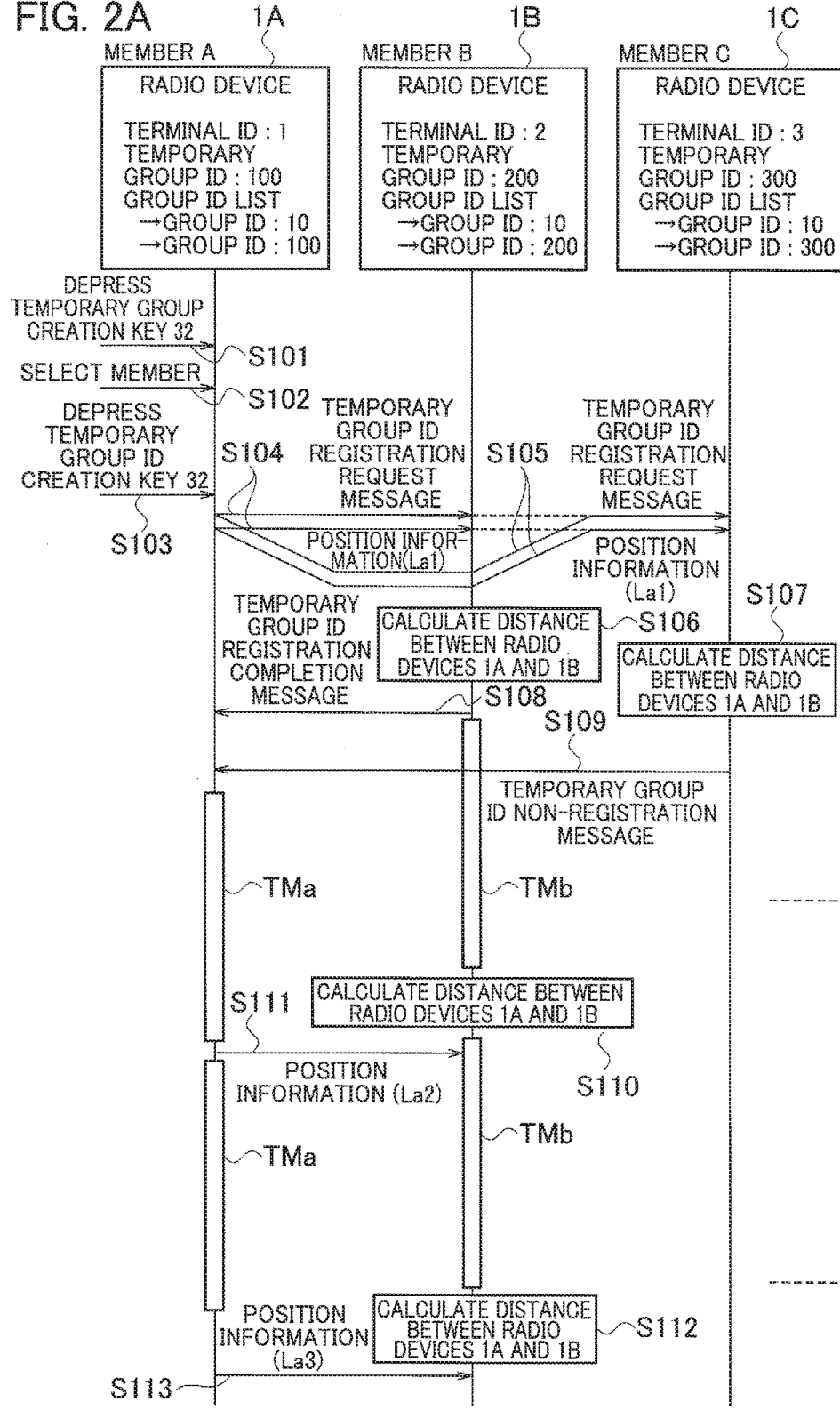

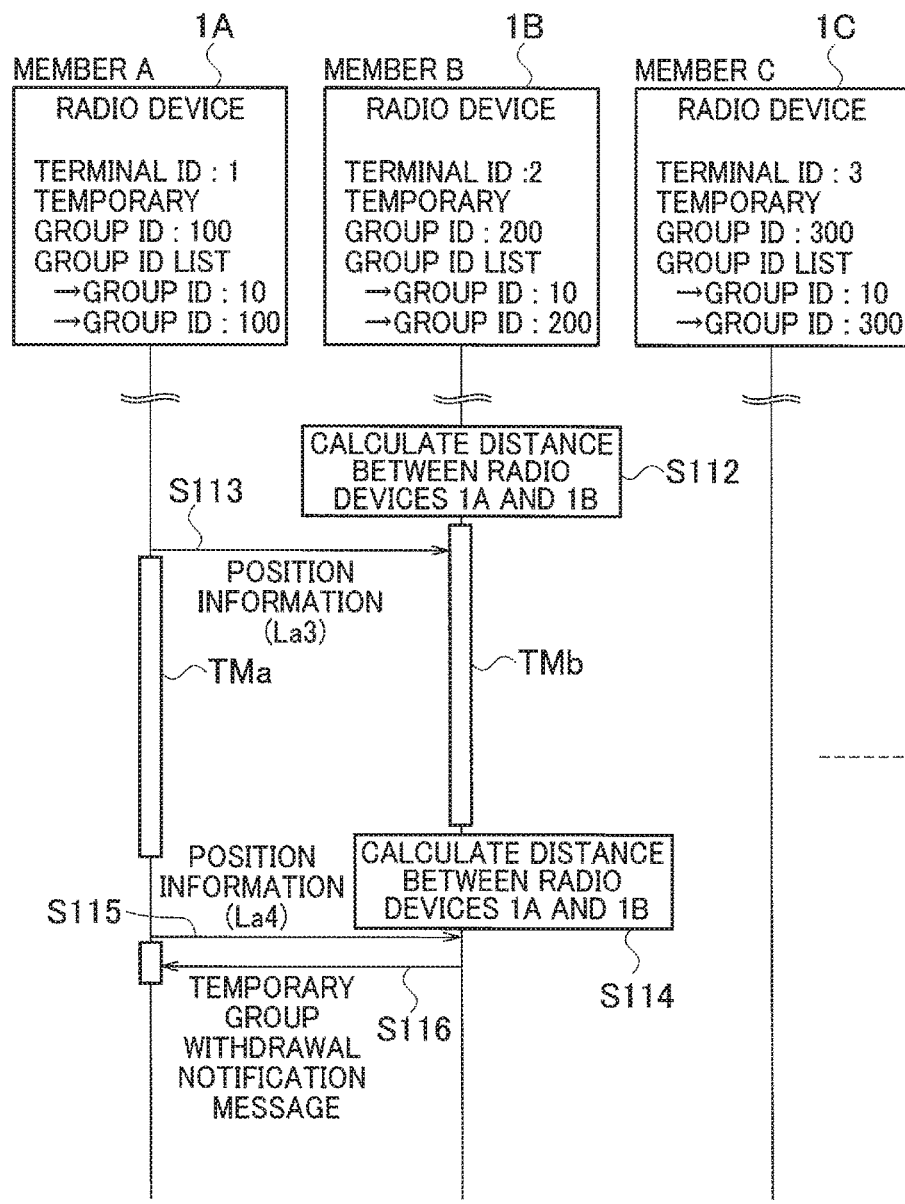

| RADIO DEVICE | TERMINAL ID |
|---|---|
| RADIO DEVICE 1B | 2 |
| RADIO DEVICE 1C | 3 |
| RADIO DEVICE 1D | 4 |
| ⋮ | ⋮ |

FIG. 6A

| RADIO DEVICE | TERMINAL ID | STATE |
|---|---|---|
| RADIO DEVICE 1B | 2 | |
| RADIO DEVICE 1C | 3 | |

FIG. 6B

| RADIO DEVICE | TERMINAL ID | STATE |
|---|---|---|
| RADIO DEVICE 1B | 2 | UNDER REQUEST |
| RADIO DEVICE 1C | 3 | UNDER REQUEST |

FIG. 6C

| RADIO DEVICE | TERMINAL ID | STATE |
|---|---|---|
| RADIO DEVICE 1B | 2 | REGISTERED |
| RADIO DEVICE 1C | 3 | |

FIG. 6D

| RADIO DEVICE | TERMINAL ID | STATE |
|---|---|---|
| RADIO DEVICE 1B | 2 | UNDER WITHDRAWAL |
| RADIO DEVICE 1C | 3 | |

FIG. 7
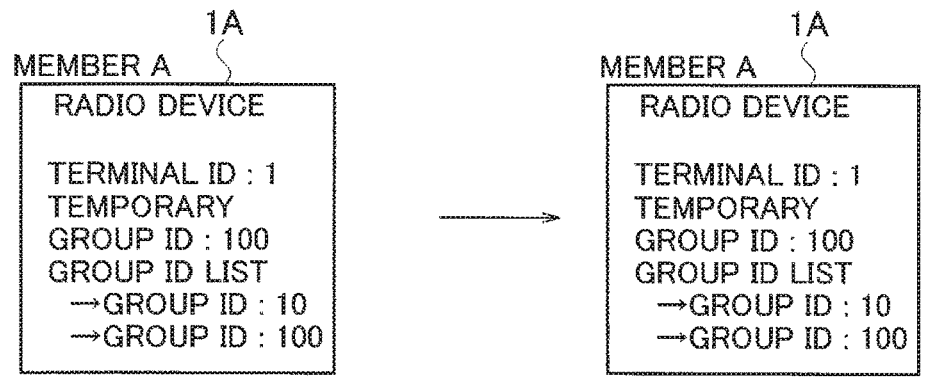
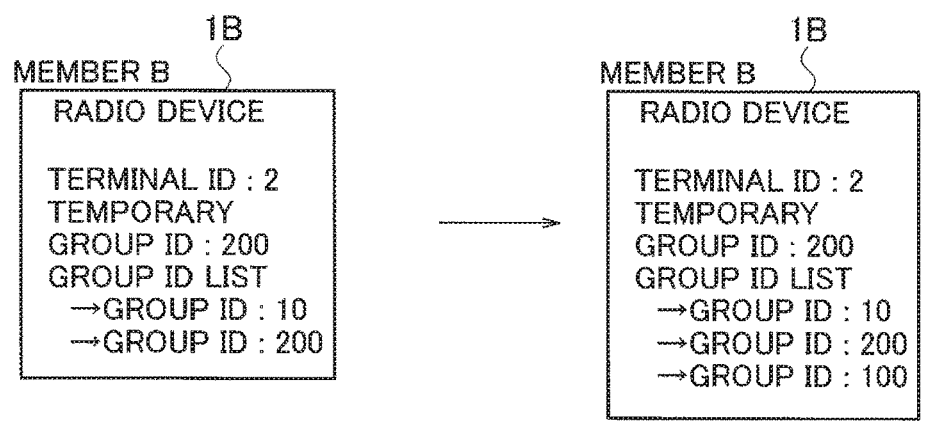
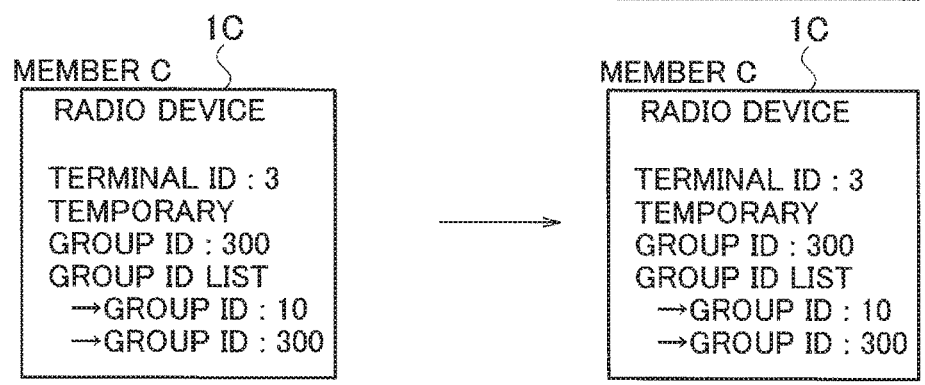
FIG. 8
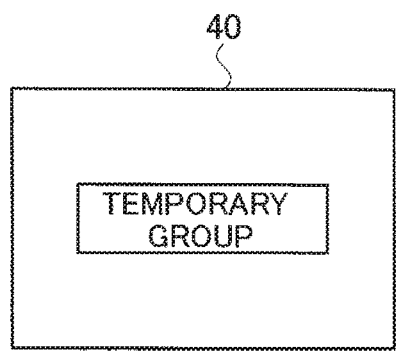

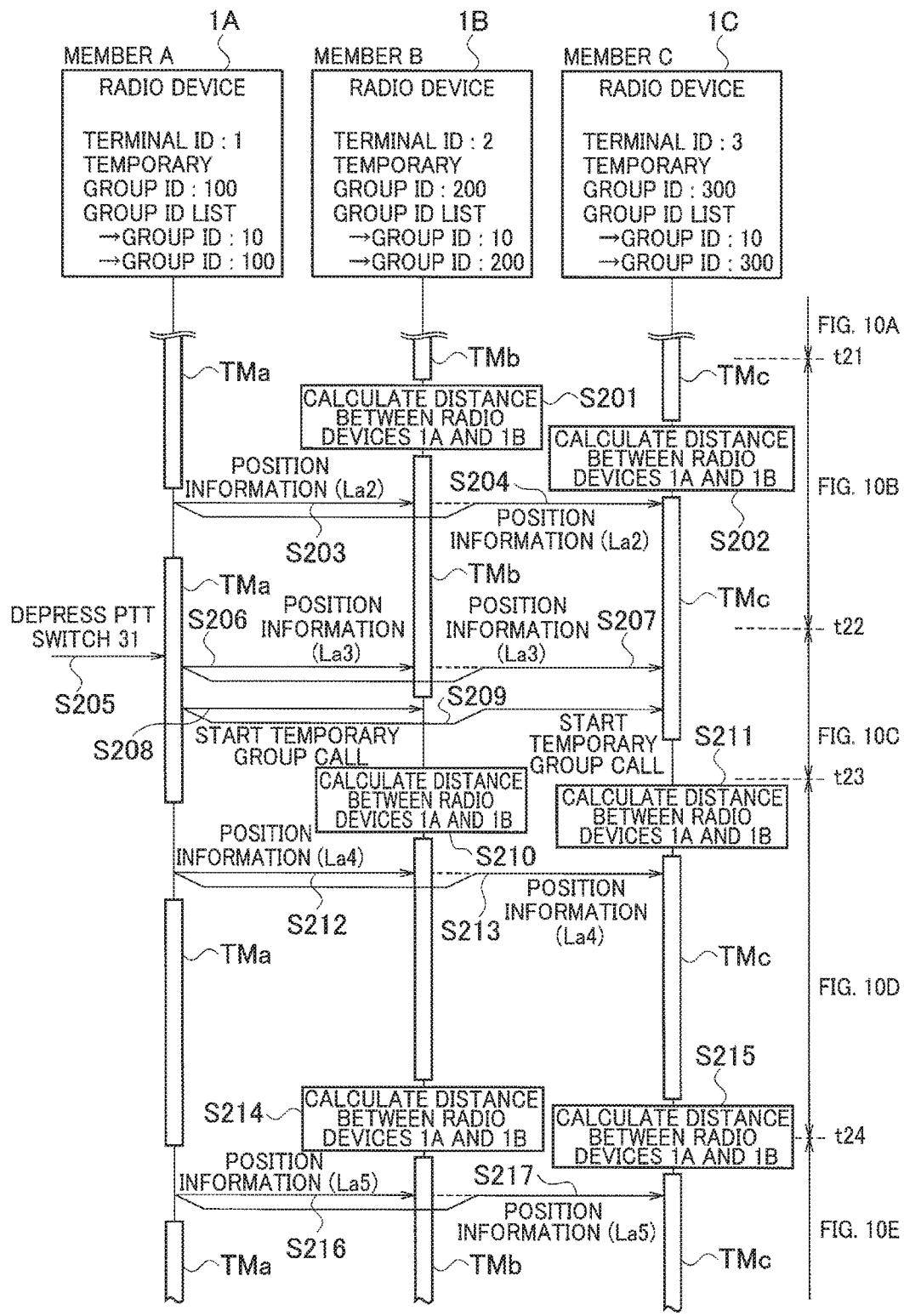

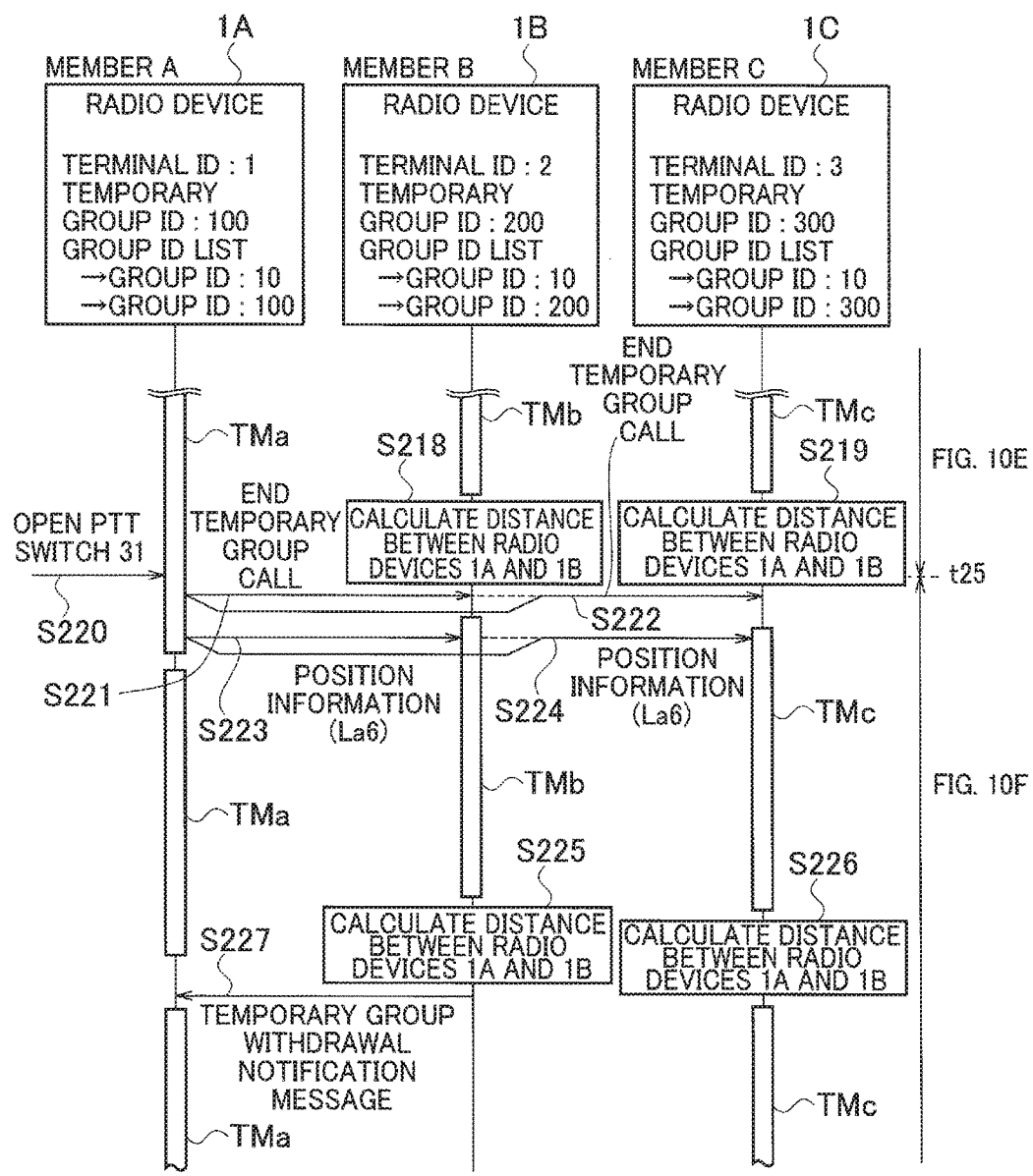

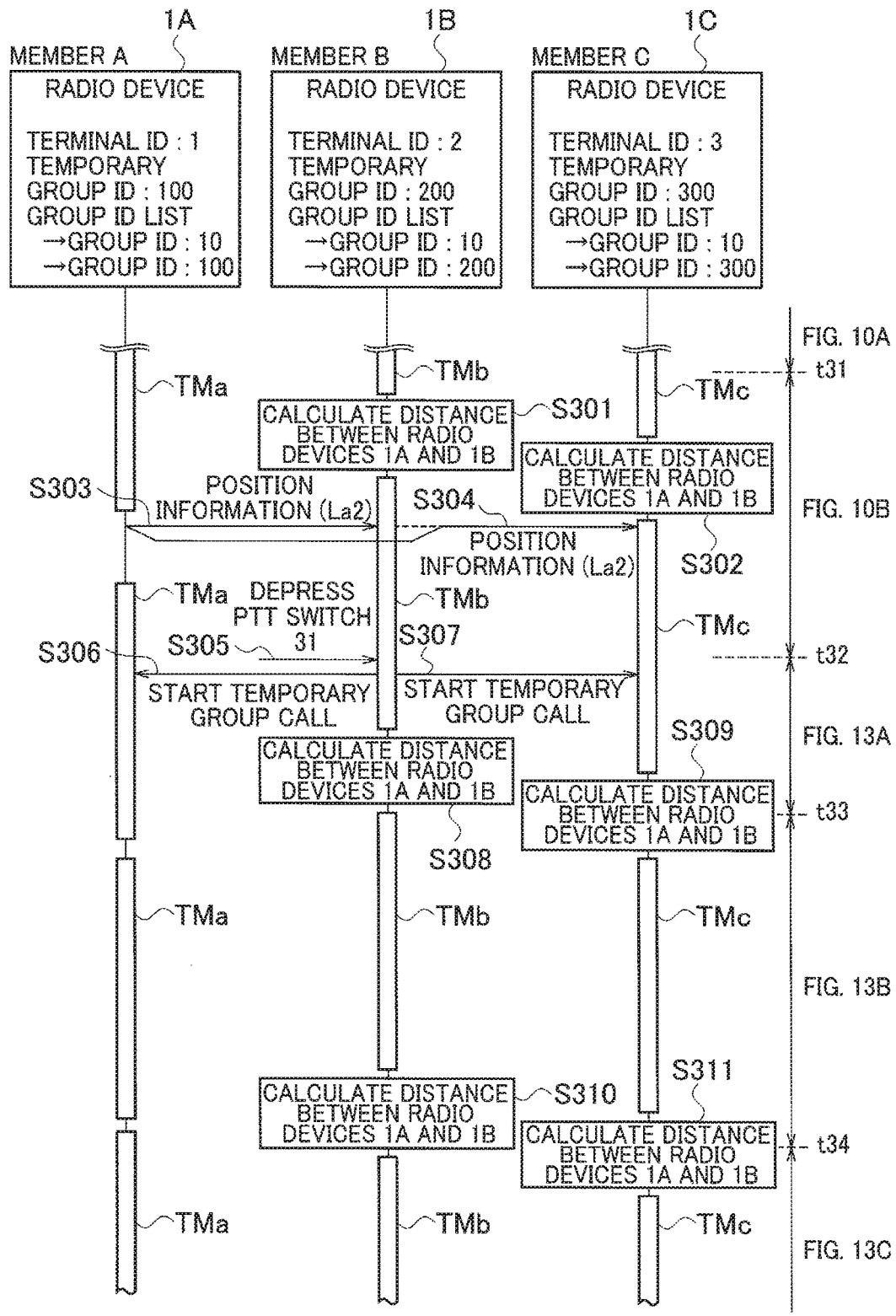

RADIO COMMUNICATION SYSTEM

CROSS REFERENCE TO RELATED APPLICATION

This application is based upon and claims the benefit of priority under 35 U.S.C.§ 119 from Japanese Patent Application No. 2016-186681 filed on Sep. 26, 2016, the entire contents of which are incorporated herein by reference.

BACKGROUND

The present disclosure relates to a radio communication system in which a plurality of temporarily grouped radio devices communicate with one another.

Japanese Unexamined Patent Application Publication No. H11 (1999)-196029 describes a radio communication system in which a fixed group of radio devices is not used, but a plurality of radio devices including a subject, radio device are arbitrarily grouped temporarily n response to a situation, and communicate with one another in a group thus formed.

SUMMARY

When a plurality of radio devices held by a plurality of members assumed to be present in a certain site are attempted to be grouped, then there is a case where a part of the members is actually remote from the site concerned. In this case, it is preferable to group the radio devices, except for the radio devices held by the members remote from the site.

Moreover, in some cases, a part of the members leaves the site after the plurality of radio devices are grouped, and it becomes pointless that the radio devices held by the members who have left the site are included in the group. In this case, it is preferable to cancel such grouping of the radio devices, which are held by the members who have left the site, without requiring complicated operations.

An aspect of the embodiment provides a radio communication system including: a first radio device configured to promote formation of a temporary group; and one or a plurality of second radio devices configured to respond to the promotion of the formation of the temporary group.

The first radio device includes: a first position information calculator configured to calculate position information of the first radio device; and a position information transmission controller configured to control to transmit the position information of the first radio device to the second radio devices at a time of promoting the formation of the temporary group.

Each of the second radio devices includes: a second position information calculator configured to calculate position information of the second radio device; a distance calculator configured to calculate a distance between the first and second radio devices based on the position information of the first radio device, the position information being transmitted from the first radio device, and based on the position information of the second radio device; and a temporary group participation controller configured to control to participate in the temporary group when the distance between the first and second radio devices, the distance being calculated by the distance calculator based on the position information of the first radio device, the position information being transmitted from the first radio device at the time when the formation of the temporary group is promoted, and based on the position information of the second radio device, is within a predetermined distance.

The first radio device further includes a temporary group formation controller configured to control to form a temporary group composed of the first radio device and at least one of the second radio devices, the at least one second radio device participating in the temporary group, when the at least one second radio device participates in the temporary group.

BRIEF DESCRIPTION OF THE DRAWINGS

FIGS. 2A and 2B are the first sequence charts showing an example of an operation of the radio communication system according to the embodiment.

FIG. 6A is a table showing the first state of temporary group member information stored in the memory of the radio device.

FIG. 6B is a table showing the second state of the temporary group member information stored in the memory of the radio device.

FIG. 6C is a table showing the third state of the temporary group member information stored in the memory of the radio device.

FIG. 6D is a table showing the fourth state of the temporary group member information stored in the memory of the radio device.

FIG. 7 is a diagram showing a group ID list when the radio devices 1B and 1C have participated in a temporary group.

FIG. 8 is a diagram showing an example of a display state on the display of the radio device that is participating in the temporary group.

FIGS. 9A and 9B are the second sequence charts showing an example of an operation of the radio communication system according to the embodiment.

FIGS. 12A and 12B are the third sequence charts showing an example of the operation of the radio communication system according to the embodiment.

DETAILED DESCRIPTION

Hereinafter, a description will be made of a radio communication system according to the embodiment with reference to the accompanying drawings. Each of a plurality of members holds a radio device 1, shown in FIG. 1. A member who has promoted formation of a temporary group will be referred to as a group former. Members who have participated in the temporary group in response to such a group former's promotion to form the temporary group will be referred to as group participants.

Figure 1:
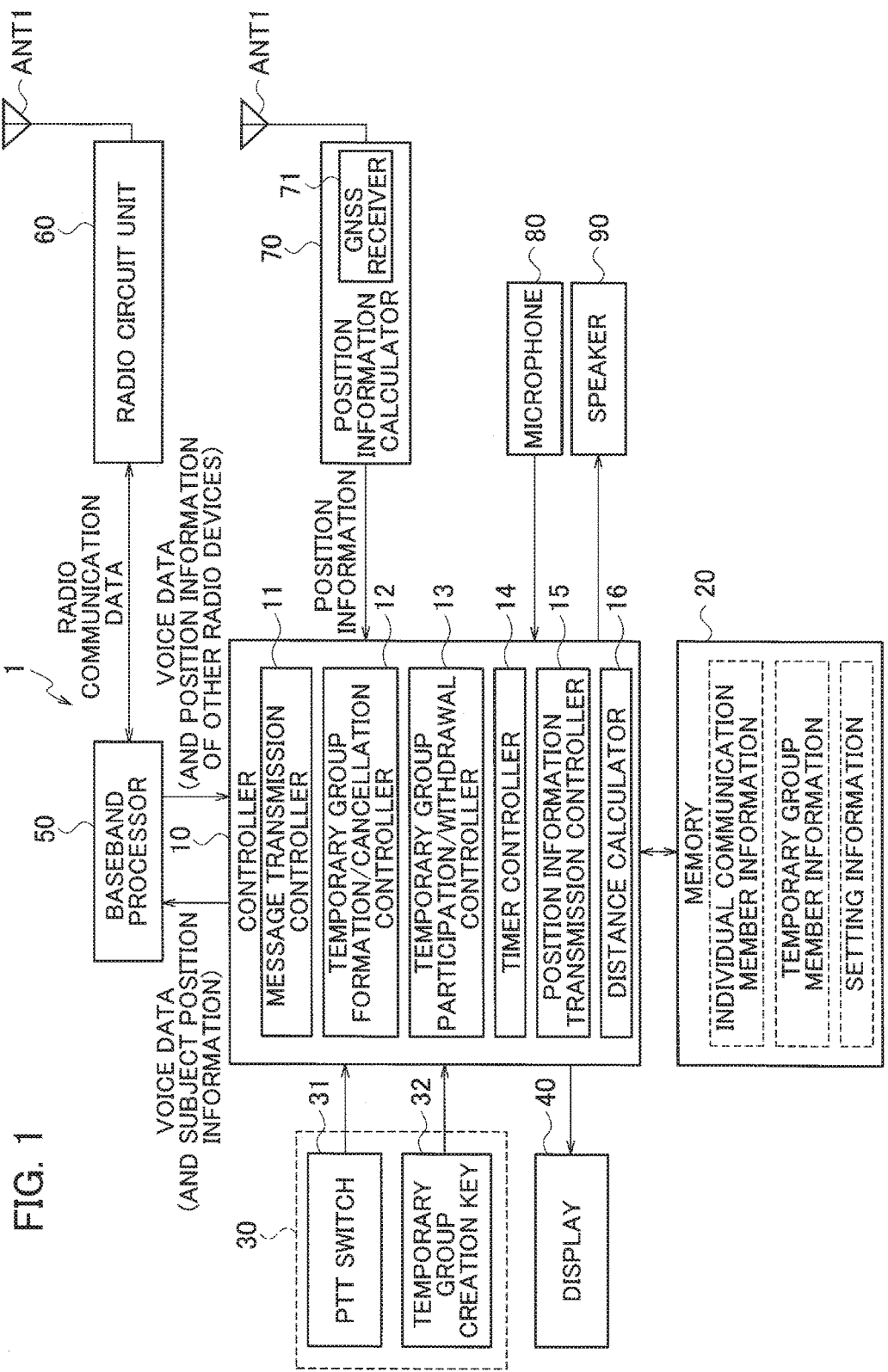
FIG. 1 is a block diagram showing a configuration example of a radio device for use in a radio communication system according to at least one embodiment.

First, a description will be made of a configuration example of the radio device 1 for use in the radio communication system with reference to FIG. 1. In FIG. 1, the radio device 1 includes a controller 10, a memory 20, an operation unit 30, a display 40, a baseband processor 50, a radio circuit unit 60, a position information calculator 70, a microphone 80, and a speaker 90. The radio device 1 includes an antenna ANT1 for radio transmission/reception, and an antenna ANT2 that receives a radio wave from a satellite for the global navigation satellite system (GNSS).

The controller 10 includes, as functional internal constituents, a message transmission controller 11, a temporary group formation/cancellation controller 12, a temporary group participation/withdrawal controller 13, a timer controller 14, a position information transmission controller 15, and a distance calculator 16.

The temporary group formation/cancellation controller 12 has two functions as a temporary group formation controller that controls to form a temporary group, and a temporary group cancellation controller that controls to cancel the formed temporary group. The temporary group participation/withdrawal controller 13 has two functions: as a temporary group participation controller that controls to participate in the temporary group, and a temporary group withdrawal controller that controls o withdraw the participation in the participating temporary group.

As will be described later, the message transmission controller 11, the temporary group formation/cancellation controller 12, the timer controller 14, and the position information transmission controller 15 operate in the radio device 1 held by the group former. The message transmission controller 11, the temporary group participation/withdrawal controller 13, the timer controller 14, and the distance calculator 16 operate in the radio device 1 held by the group participant.

The memory 20 stores individual communication member information and a variety of setting information. The memory 20 of the radio device 1 held by the group former stores temporary group member information at the time of forming the temporary group.

The controller 10 and the memory 20 may be composed of a microcomputer. The controller 10 may be a central processing unit (CPU) of the microcomputer. The message transmission controller 11, the temporary group formation/cancellation controller 12, the temporary group participation/withdrawal controller 13, the timer controller 14, the position information transmission controller 15, and the distance calculator 16 may be functions executed by software a computer program).

The operation unit 30 is a variety of keys (buttons) provided in a housing of the radio device 1. The operation unit 30 includes a PTT switch 31 and a temporary group creation key 32. A function to create the temporary group may be assigned to an arbitrary key, which is provided on the housing and is other than the PTT switch 31, whereby the arbitrary key may be used as the temporary group creation key 32. Although not shown, the operation unit 30 also includes: a power key for turning on/off a power supply; channel selection keys for selecting a channel (frequency) at the time of communicating with another radio device 1; up/down/left/right cursor keys, and the like.

The position information calculator 70 includes a GNSS receiver 71 that receives a GNSS signal outputted from the antenna ANT2. The GNSS is a GPS (Global Positioning System) as an example. The position information calculator 70 calculates position information of the subject radio device 1 thereof by using a GNSS signal that is based on radio waves from three or more satellites, and supplies the calculated position information to the controller 10. The memory 20 may store the position information of the subject radio device 1. The controller 10 and the position information calculator 70 may be integrated with each other.

When a user depresses the PTT switch 31 to utter a voice toward the microphone 80, the controller 10 performs A/D conversion for the voice signal, which is outputted from the microphone 80, and supplies voice data to the baseband processor 50. The baseband processor 50 converts the voice data into radio communication data for transmitting the voice data by radio, and supplies the radio communication data to the radio circuit unit 60. The radio circuit unit 60 transmits the radio communication data from the antenna. ANT1 by a radio wave.

In some cases, the controller 10 of the radio device 1 held by the group former supplies the position information of the subject radio device 1 to the baseband processor 50 in addition to the voice data, or independently of the voice data. In some cases, the baseband processor 50 supplies radio communication data, which includes the position information of the subject radio device 1, to the radio circuit unit 60.

The radio circuit unit 60 converts a received signal, which is received from another radio device 1 via the antenna ANT1, into radio communication data, and supplies the radio communication data to the baseband processor 50. The baseband processor 50 supplies the voice data to the controller 10. The radio circuit unit 60 transmits and receives a radio signal by using a half duplex communication mode.

In some cases, the radio circuit unit 60 of the radio device 1 held by the group participant receives the position information of the radio device 1, which is held by the group former, from the radio device 1 held by the group former. In some cases, the baseband processor 50 supplies the received position information to the controller 10 in addition to the voice data or independently of the voice data. The memory 20 may store the received position information of the radio device 1.

The controller 10 performs D/A conversion for the voice data, and supplies a voice signal to the speaker 90. The speaker 90 outputs a voice based on the voice signal.

The message transmission controller 11 controls to transmit a message to another radio device 1. In some cases, the temporary group formation/cancellation controller 12 controls to form a temporary group, and to cancel the formed temporary group. In some cases, the temporary group participation/withdrawal controller 13 performs to control participation in the temporary group and withdrawal of the participation.

In some cases, the timer controller 14 activates a timer when the subject radio device 1 and one or a plurality of other radio devices 1 form the temporary group. In some cases, the position information transmission controller 15 of the radio device 1 held by the group former controls to transmit the position information of the subject radio device 1 to such radio devices 1 held by such group participants. In some cases, the distance calculator 16 of the radio device 1, held by each of the group participants, calculates the distance between the subject radio device 1 and the radio device 1, which is held by the group former, based on the position information of the subject radio device 1, and the position information of the radio device 1 held by the group former.

<First Sequence Example>

Referring to FIG. 2A, FIG. 2B, FIGS. 3A to 3D, FIG. 4, FIG. 5, FIGS. 6A to 6D, FIG. 7, and FIG. 8, a description will be made of a basic operation when the radio communication system forms the temporary group. As shown in FIG. 2A, as an example, it is assumed that there are at least three radio devices 1 shown in FIG. 1. Radio devices 1 held by members A to C will be referred to as radio devices 1A, 1B, and 1C, respectively. Such a radio device 1, which promotes the formation of the temporary group, and at least one radio device 1, which participates in the temporary group in response to the promotion of the formation of the temporary group, constitute the radio communication system.

1 to 3 as terminal IDs and 100, 200, and 300 as temporary group IDs are set for the radio devices 1A to 1C, respectively. The radio devices 1A to 1C have a group ID list. As described in the group ID list, 10 is set as a group ID for the radio devices 1A to 1C. This group ID is an ID indicating a fixed group different from the temporary group. That is, the radio devices 1A to 1C belong to the fixed group in advance.

Moreover, for the radio devices to 1C, 100, 200, and 300 are set as group IDs, respectively. These group IDs indicate temporary group IDs. The terminal IDs, the temporary group IDs, and the group ID list are stored as setting information in the memory 20.

The member A is about to form a temporary group composed of a plurality of the radio devices 1, including a radio device 1A. In FIG. 2, the member A as the group former depresses the temporary group creation key 32 in step S101.

Figures 4, 5:
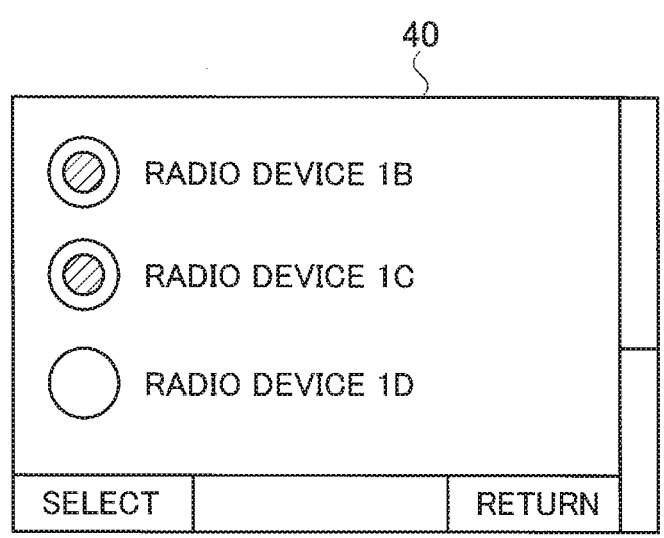
FIG. 4 is a table showing an example of individual communication member information stored in a memory of the radio device.
FIG. 5 is a view showing a display example of a list of members displayed on a display when members of a temporary group are selected.

As shown in FIG. 4, the memory 20 stores individual communication member information in which the radio devices 1 and the terminal IDs are associated with each other. As shown in FIG. 5, the controller 10 causes the display 40 to display a list of the radio devices 1 of the members, with whom the member A is capable of individually communicating, based on the individual communication member information. Although only the radio devices 1B to 1D are displayed in FIG. 4, other radio devices 1 can be displayed by the cursor keys.

The members with whom the member A is capable of communicating are not limited to those holding the radio devices 1B and 1C with the group IDs of 10. Such a radio device 1, which is registered in the individual communication member information so as to be capable of individually communicating with the radio device 1A though a group ID thereof is other than 10, is displayed in the list of the display 40.

In FIG. 2A, in step S102, the member A selects members who wish to participate in the temporary group. It is assumed that, as shown in FIG. 5, the member A selects the radio devices 1B and 1C (members B and C) in step S102. The temporary group formation/cancellation controller 12 causes the memory 20 to store the temporary group member information as shown in FIG. 6A, in which the radio devices 1, the terminal IDs and states are associated with one another.

The temporary group member information includes the terminal IDs, which are identification information for identifying the radio devices 1 of the group participants included in the temporary group. At the point of time when the temporary group member information is created, nothing stored in an item of the state.

In step S103, the member A performs a predetermined operation, and thereby transmits a temporary group ID registration request to the radio devices 1B and 1C.

In step S104, the message transmission controller 11 of the radio device 1A controls to transmit a temporary group ID registration request message (hereinafter, abbreviated as a registration request message) and the position information of the radio device 1A to the radio device 1B. In step S105, the message transmission controller 11 of the radio device controls to transmit the registration request message and the position information of the radio device 1A to the radio device 1C. The registration request message includes the terminal IDs of the senders, the terminal ID of the transmission destination, the temporary group ID of the senders, and distance information indicating an upper limit value of the distance in the case of forming the temporary group.

Steps S104 and S105 of transmitting the registration request message and the position information of the radio device 1A may be performed by simultaneous distribution for transmission to a plurality of the radio devices 1.

Figure 3A:
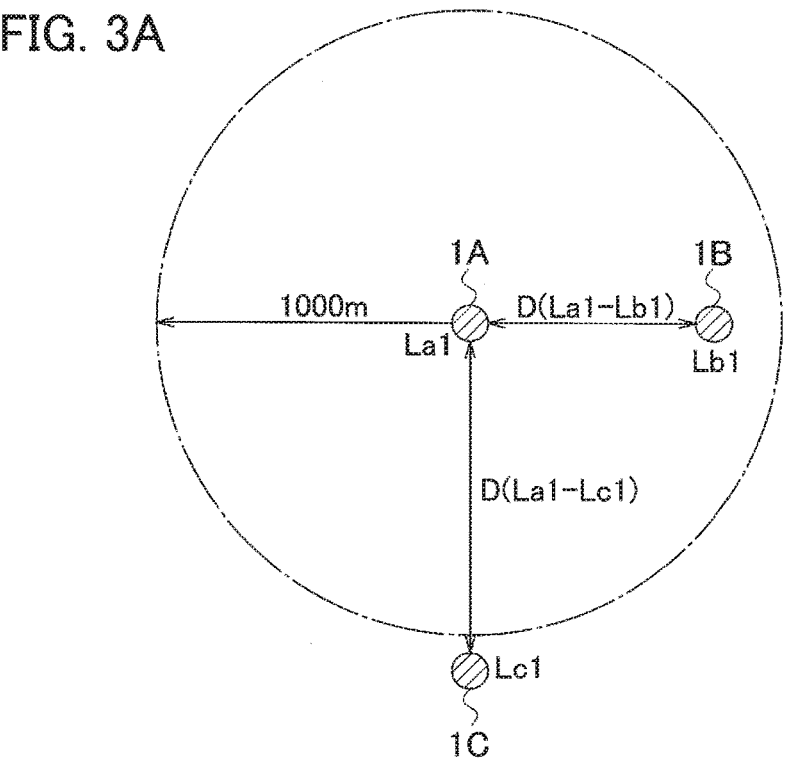
FIG. 3A is a view showing the positional relationship between radio devices 1A to 1C until time t11 of FIG. 2A.

Here, it is assumed that the radio devices 1A to 1C are in the positional relationship as shown in FIG. 3A. Latest positions of the radio devices 1A to 1C are indicated by hatched circles. The radio devices 1A to 1C are located at positions La1, Lb1, and Lc1, respectively. It is assumed that the distance information included in the registration request message is 1000 m as an example. The distance information may be set to a predetermined distance that is not suitable for allowing the radio devices to participate in the temporary group.

As shown in FIG. 6B, the temporary group formation/cancellation controller 12 of the radio device 1A stores data, which shows "under request" meaning that a request to register the temporary group IDs is issued to the radio devices 1B and 1C, in the item of the state of the temporary group member information.

In step S106, the distance calculator 16 of the radio device 1B calculates the distance between the radio devices 1A and 1B based on the position information of the radio device 1A, which is transmitted from the radio device 1A, and the position information of the radio device 1B. The distance between the radio devices 1A and 1B is D(La1-Lb1). In step S107, the distance calculator 16 of the radio device 1C calculates the distance between the radio devices 1A and 1C based on the position information of the radio device 1A, which is transmitted from the radio device 1A, and the position information of the radio device 1B. The distance between the radio devices 1A and 1C is D (La1-Lc1).

As shown in FIG. 3A, the distance D (La1-Lb1) between the radio devices 1A and 1B is within 1000 m. Accordingly, in step S108, the message transmission controller 11 of the radio device 1B controls to transmit a temporary group ID registration completion message (hereinafter, abbreviated as a registration completion message), which indicates that the registration of the temporary group ID to the radio device 1A is completed.

The distance D (La1-Lc1) between the radio devices 2A and 1C exceeds 1000 m. Accordingly, in step S109, the message transmission controller 11 of the radio device 1C controls to transmit a temporary group ID non-registration message (hereinafter, referred to as a non-registration message), which indicates to the radio device 1A that the temporary group ID is not registered.

When the radio device 1A receives the registration completion message from the radio device 1B, then, as shown in FIG. 6C, the temporary group formation/cancellation controller 12 of the radio device 1A stores data, which indicates "registration", meaning that the radio device 1B is registered in the temporary group ID in the item of the state of the temporary group member information. In this way, the controller 10 of the radio device 1A can recognize the radio device 1, which is participating in the temporary group by the temporary group member information shown in FIG. 6C.

The radio device 1A receives the temporary group ID non-registration message from the radio device 1C, and accordingly, deletes the data, which indicates "under request" in the item of the state of the temporary group member information. The radio device 1A may store data, which indicates "non-registration", meaning that the radio device 1B has not registered the temporary group ID in the item of the state of the temporary group member information.

As shown in FIG. 7, the temporary group participation/withdrawal controller 13 of the radio device 1B additionally writes 100 as the temporary group ID of the radio device 1A into the group ID list. In this way, the controller 10 of the radio device 1B can recognize that the radio device 1B is participating in the temporary group promoted by the radio device 1A (member A). There is no change in the group ID list of the radio devices 1A and 1C.

When the radio devices 1A and 1B form the temporary group, then as shown in FIG. 8, it is preferable that the controller 10 cause the display 40 to display characters or an image, which indicates that the temporary group is being formed.

Immediately after the radio device 1B transmits the registration completion message to the radio device 1A, the timer controller 14 of the radio device 1B activates a timer TMb of a predetermined time. A predetermined time of the timer TMb is, for example, 10 seconds. The radio device 1C transmits the temporary group ID non-registration message, and accordingly, the timer controller 14 of the radio device 1C does not activate the timer.

When the radio device 1A receives the registration completion message or the non-registration message from each of all of the radio devices (here, the radio devices 1B and 1C), each of which has transmitted the registration completion message, the timer controller 14 of the radio device 1A activates a timer TMa of the predetermined time. The predetermined time of the timer TMa is 10 seconds, which is the same as that of the timer TMb. Although it is not necessary that the time of the timer TMa and the time of the timer TMb (and a timer TMc to be described later) be the same time, both may be the same time.

Figure 3B:
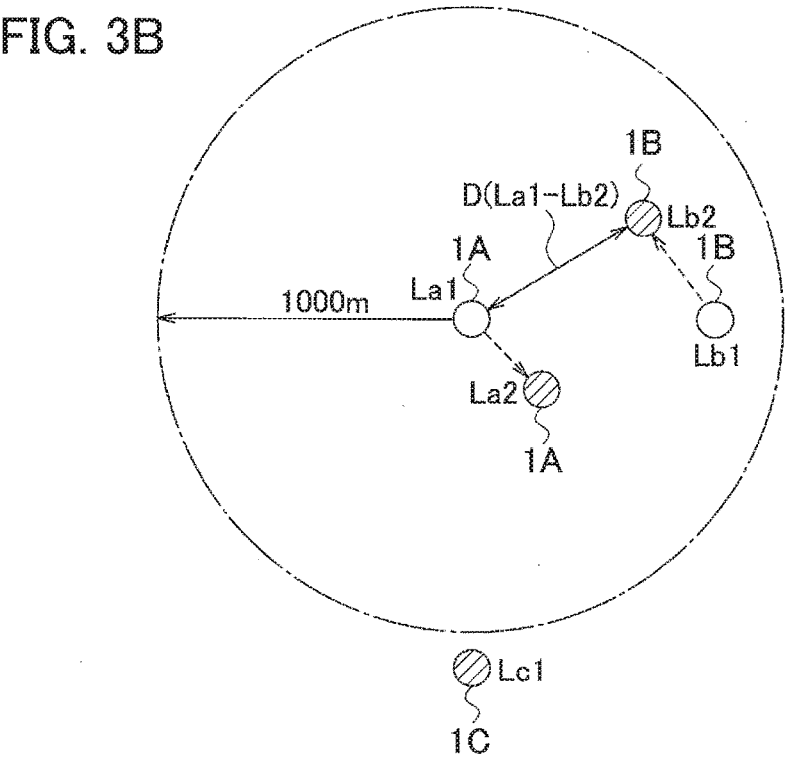
FIG. 3B is a view showing the positional relationship between the radio devices 1A to 1C during the period from time t11 until time t12 of FIG. 2A.

It is assumed that, as shown in FIG. 3B, on and after the time t11, the radio device 1A moves to a position La2, and the radio device 1B moves to a position Lb2. When the timer TMb expires, the distance calculator 16 of the radio device 1B calculates the distance between the radio devices 1A and 1B in step S110. At this point in time, the radio device 1B has not received position information indicating the new position La2 of the radio device 1A. Hence, in step S110, the distance calculator 16 of the radio device 1B calculates the distance D (La1-Lb2) between the radio devices 1A and 1B.

The distance calculator 16 of the radio device 1B detects that the distance (La1-Lb2) is within 1000 m. Hence, the temporary group participation/withdrawal controller 13 of the radio device 1B causes the radio device 1B to continue to participate in the temporary group.

When the timer TMa expires, then in step S111, the radio device 1A transmits the position information, which indicates the position La2 of the radio device 1A, to the radio device 1B. Here, the number of radio devices 1 to which the position information is to be transmitted is one, and the position information is transmitted to only the radio device 1B; however, if the radio devices 1 which are other than the radio device 1A and are participating in the temporary group are plural, then the position information is simultaneously distributed to all of the radio devices 1 other than the radio device 1A.

When the timer TMa expires, the radio device 1A transmits the subject position information thereof to the radio device (here, the radio device 1B), which participates in the temporary group, activates the timer TMa upon completing the transmission of the position information, and repeats this operation. That is, the radio device 1 of the group former transmits the subject position information thereof to the radio device 1 of the group participant every predetermined time (here, 10 seconds). That is, the position information transmission controller 15 of the radio device 1A controls to periodically transmit the position information of the radio device 1A to the radio device 1 participating in the temporary group.

The radio device 1B calculates the distance between the radio devices 1A and 1B when the timer TMb expires, activates the timer TMb upon completing of calculation of the distance, and repeats this operation. That is, based on the position information of the radio device 1 of the group former, which is transmitted from the radio device 1 of the group former, and based on the position information of the radio device 1 of the group participant, the radio device 1 of the group participant calculates the distance between both of the radio devices 1 every predetermined time (here, 10 seconds). That is, the distance calculator 16 of the radio device 1B periodically calculates the distance between the radio devices 1A and 1B. At this time, the distance calculator 16 calculates the distance between the position indicated by the position information last transmitted from the radio device 1A and the position indicated by the latest position information calculated by the position information calculator 70 of the radio device 1B.

In FIG. 2A and sequence charts subsequent thereto, the timers are repeated continuously in a time direction; however, in some cases, the timers adjacent to one another are illustrated so as to be spaced apart from one another for the sake of convenience of drawing figures.

Figure 3C:
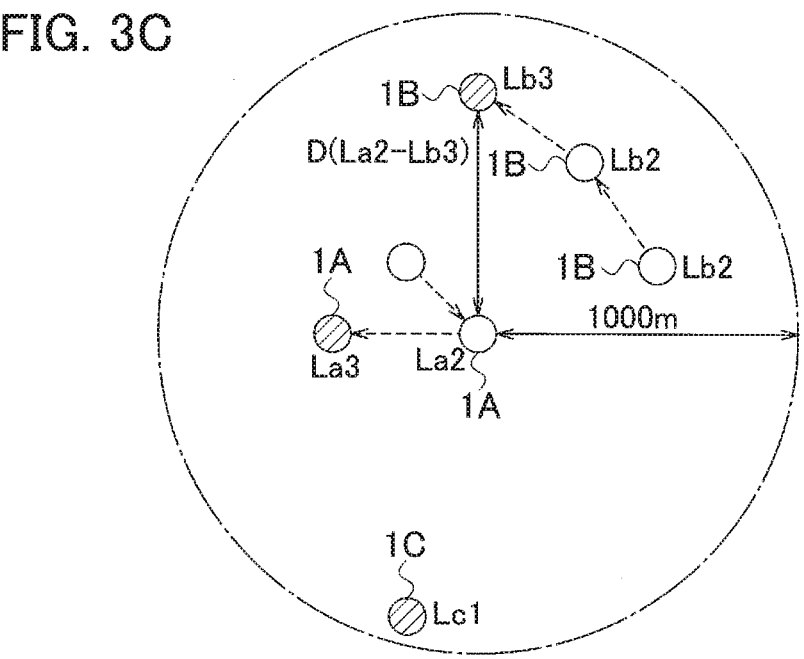
FIG. 3C is a view showing the positional relationship between the radio devices 1A to 1C during the period from time t11 of FIG. 2A until time t13 of FIG. 2B.

It is assumed that, as shown in FIG. 3C, on and after time t12, the radio device 1A moves to a position La1, and the radio device 1B moves to a position Lb3. In step S112, the distance calculator 16 of the radio device 1B calculates the distance between the radio devices 1A and 1B. At this point of time, the radio device 1B has not received position information indicating the new position La3 of the radio device 1A, and accordingly, the distance calculator 16 of the radio device 1B calculates the distance D(La2-Lb3) between the radio devices 1A and 1B.

The distance calculator 16 of the radio device 1B detects that the distance D(La2-Lb3) is within 1000 m. Hence, the temporary group participation/withdrawal controller 13 of the radio device 1B causes the radio device 1B to continue to participate in the temporary group.

In step S113, the radio device 1A transmits the position information, which indicates the position La3 of the radio device 1A, to the radio device 1B.

Figure 3D:
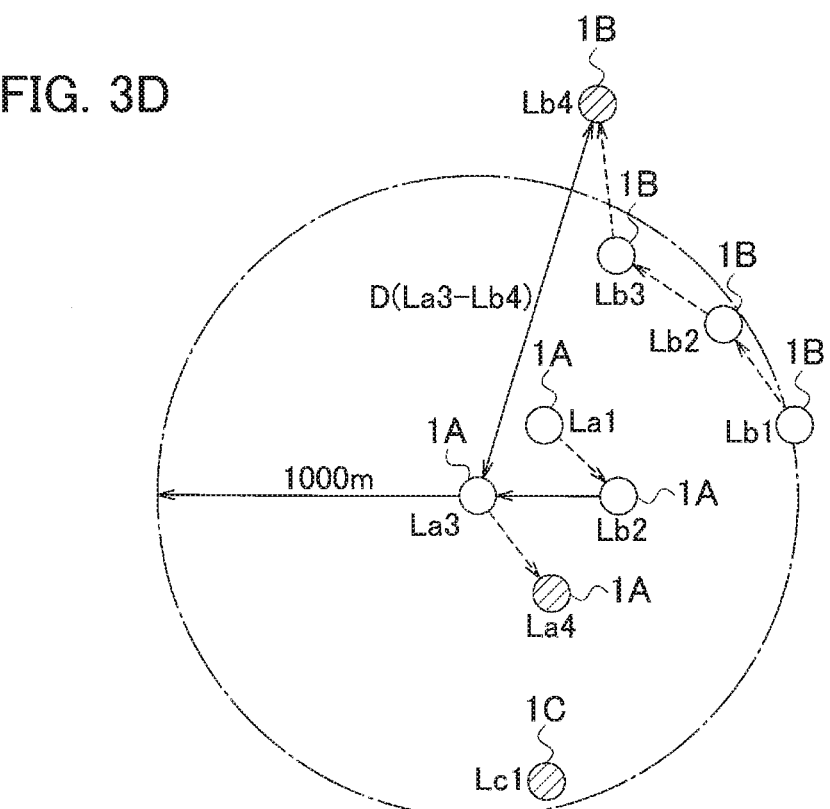
FIG. 3D is a view showing the positional relationship between the radio devices 1A to 1C on and after time t13 of FIG. 2B.

It is assumed that, subsequently in FIG. 2B, on and after time t13, as shown in FIG. 3D, the radio device 1A moves to a position La4, and the radio device 1B moves to a position Lb4. In step S114, the distance calculator 16 of the radio device 1B calculates the distance between the radio devices 1A and 1B. At this point of time, the radio device 1B has not received position information indicating the new position La4 of the radio device 1A, and accordingly, the distance calculator 16 of the radio device 1B calculates the distance D(La3-Lb4) between the radio devices 1A and 1B. In step S115, the radio device 1A transmits the position information, which indicates the position La4 of the radio device 1A, to the radio device 1B.

In step S114, the distance calculator 16 of the radio device 1B detects that the distance D (La3-Lb4) exceeds 1000 m. Accordingly, the temporary group participation/withdrawal controller 13 of the radio device 1B deletes 100 as the temporary group ID of the radio device 1A from the group ID list, and withdraws the participation thereof in the temporary group. In addition to this, in step S116, the message transmission controller 11 of the radio device 1B controls to transmit a temporary group withdrawal notification message to the radio device 1A.

On and after step S116, there are no radio devices 1 participating in the temporary group, and accordingly, the temporary group formation/cancellation controller 12 of the radio device 1A cancels the temporary group, and the timer controller 14 stops the timer TMa. As shown in FIG. 6D, the temporary group formation/cancellation controller 12 stores data, which indicates "under withdrawal" meaning that the radio device 1B is withdrawn from being the member of the temporary group, in the item of the state of the temporary group member information.

FIG. 2A and FIG. 2B illustrate the case where the group participant is only the member B; however, when there are a plurality of the group participants, the temporary group is canceled at the point of time when all of the group participants have withdrawn the participation in the temporary group.

It is assumed that the member A is trying to form a temporary group one more time with the member B (radio device 1B) who is the same member as the member of the temporary group once created. When the member A depresses the temporary group creation key 32 for a long time, the temporary group formation/cancellation controller 12 of the radio device 1A controls to transmit the temporary group ID registration request to the radio device 1B in a similar way to step S103 based on the temporary group member information shown in FIG. 6D. The message transmission controller 11 of the radio device 1A transmits the registration request message and the position information to the radio device 1B in a similar way to step S104.

Such a long-time depression of the temporary group creation key 32 is an example of an instruction to form the same temporary group after the temporary group is canceled.

Even when the temporary group s temporarily canceled, as shown in FIG. 6D, the temporary group member information holds the identification information indicating the group participant before the temporary group is canceled, and accordingly, the member A can form the same temporary group one more time without performing such member selection as in step S102 one more time.

<Second Sequence Example>

Next, referring to FIG. 9A, FIG. 9B, and FIGS. 10A to 10E, a description will be made of an operation when the member A as the group former originates a call from the radio device 1A, in order to talk with the members B and C in the case where the radio communication system forms the temporary group.

Figure 10A:
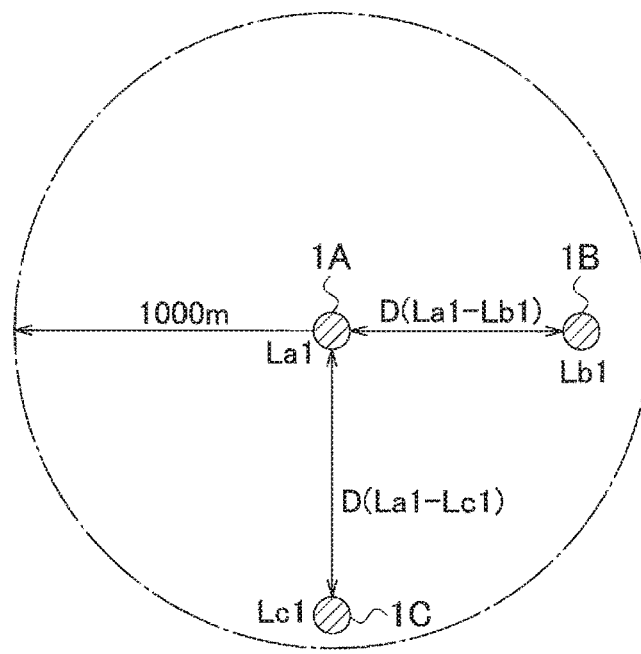
FIG. 10A is a view showing the positional relationship between the radio devices 1A to 1C until time t21 of FIG. 9A.

In FIG. 9A, it is assumed that the radio devices 1A to 1C are in such a positional relationship as shown in FIG. 10A until time t21. The radio devices 1B and 1C are located within a distance of 1000 m from the radio device 1A. By a similar operation to that in steps S101 to S105 of FIG. 2A, the radio device 1A transmits the registration request message and the position information of the radio device 1A to the radio devices 1B and 1C. In FIG. 9A, the radio devices 1B and 1C transmit a registration completion message to the radio device 1A, and the radio devices 1A to 1C form a temporary group.

Figure 10B:
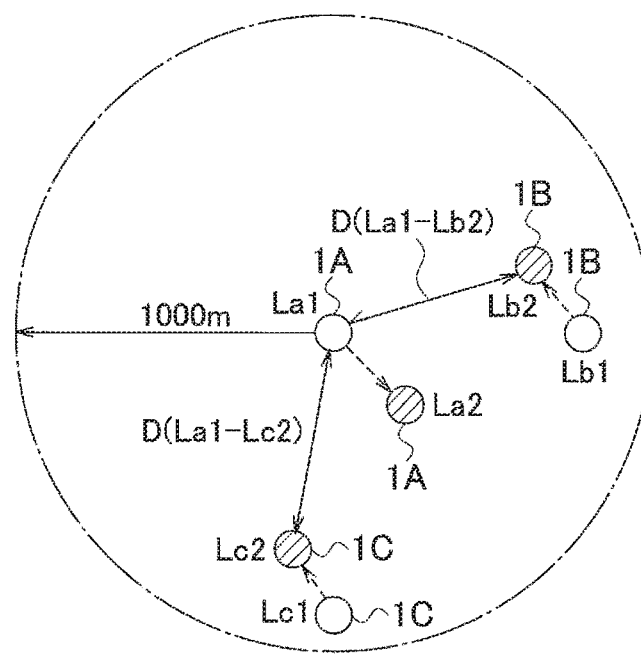
FIG. 10B is a view showing the positional relationship between the radio devices 1A to 1C during the period from time t21 until time t22 of FIG. 9A.

It is assumed that, as shown in FIG. 10B, on and after time t21, the radio device 1A moves to the position La2, the radio device 1B moves to the position Lb2, and the radio device 1C moves to a position Lc2. When the timers TMb and TMc expire individually, the distance calculators 16 of the radio devices 1B and 1C calculate the distance between the radio devices 1A and 1F and the distance between the radio devices 1A and 1C in steps S201 and S202.

At this point in time, the radio devices 1B and 1C have not received position information indicating the new position La2 of the radio device 1A. Hence, in steps S201 and S202, the distance calculators 16 of the radio devices 1B and 1C calculate the distance D (La1-Lb2) between the radio devices 1A and 1B and the distance D (La1-Lc2) between the radio devices 1A and 1C.

When the timer TMa expires, then in steps S203 and S204, the radio device 1A transmits the position information, which indicates the position La2 of the radio device 1A, to the radio devices 1B and 1C.

Figure 10C:
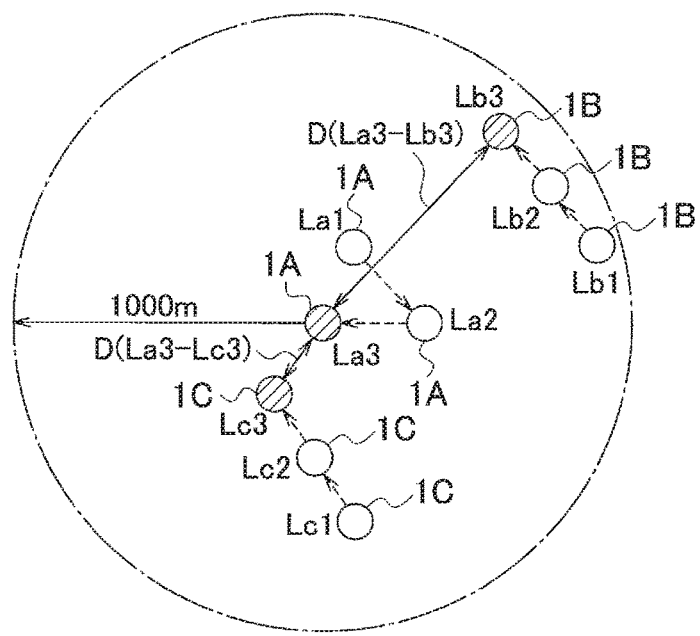
FIG. 10C is a view showing the positional relationship between the radio devices 1A to 1C during the period from, time t22 until time t23 of FIG. 9A.

It is assumed that, as shown in FIG. 10C, on and after time t22, the radio device 1A moves to the position La3, the radio device 1B moves to the position Lb3, and the radio device 1C moves to a position Lc3. In step S205, the member A depresses the PTT switch 31 of the radio device 1A. Then, in steps S206 and S207, the radio device 1A transmits the position information, which indicates the position La3 of the radio device 1A, to the radio devices 1B and 1C.

Moreover, in steps S208 and S209, the radio device 1A starts a temporary group call, and transmits a voice signal to the radio devices 1B and 1C. Note that, if the member A utters a voice toward the microphone 80, then a transmitted voice signal includes an actual voice signal; however, if the member A does not utter the voice, then the transmitted voice signal is an almost silent voice signal. While the member A continues to depress the PTT switch 31 of the radio device 1A, the temporary group call by the members A to C is continued.

The order of the transmission of the position information by steps S206 and S207 and the start of the temporary group call by steps S208 and S209 may be reversed. The position information of the radio device 1A only needs to be transmitted simultaneously with when the temporary group call is started.

When the timers TMb and TMc expire individually, the distance calculators 16 of the radio devices 1B and 1C calculate the distance D (La3-Lb3) between the radio devices 1A and 1B and the distance D (La3-Lc3) between the radio devices 1A and 1C in steps S210 and S211.

Figure 10D:
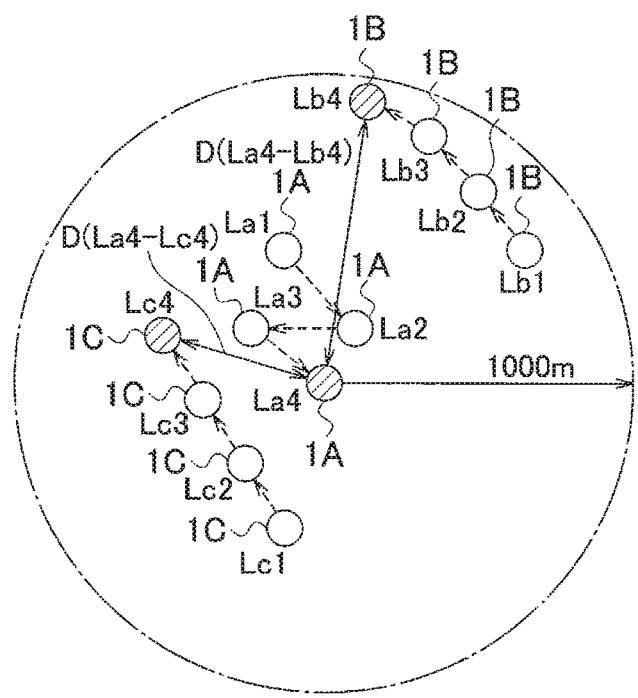
FIG. 10D is a view showing the positional relationship between the radio devices 1A to 1C during the period from time t23 until time t24 of FIG. 9A.

It is assumed that, as shown FIG. 10D, on and after time t23, the radio device 1A moves to a position La4, the radio device B moves to a position Lb4, and the radio device 1C moves to a position Lc4. When the timer TMa expires, then, in steps S212 and S213, the radio device 1A transmits position information, which indicates the position La4 of the radio device 1A, to the radio devices 1B and 1C.

During a period while the temporary group call by the members A to C is continued since the radio device 1A originates the call, the position information of the radio device 1A is periodically superimposed on the voice signal transmitted from the radio device 1A to the radio devices 1B and 1C, and is transmitted to the radio devices 1B and 1C.

When the timers TMb and TMc expire individually, the distance calculators 16 of the radio devices 1B and 1C calculate the distance D (La4-Lb4) between the radio devices 1A and 1B and the distance D (La4-Lc4) between the radio devices 1A and 1C in steps S214 and S215.

Figure 10E:
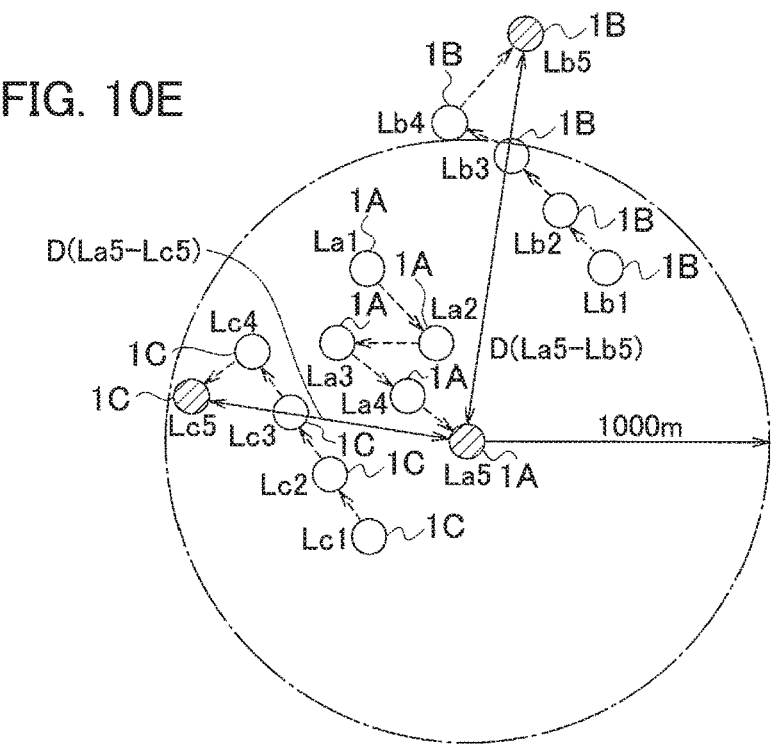
FIG. 10E is a view showing the positional relationship between the radio devices 1A to 1C during the period from time t24 of FIG. 9A until time t25 of FIG. 9B.

It is assumed that, as shown in FIG. 10E, on and after time t24, the radio device 1A moves to a position La5, the radio device 1B moves to a position Lb5 and the radio device 1C moves to a position Lc5. When the timer TMa expires, then, in steps S216 and S217, the radio device 1A transmits position information, which indicates the position La5 of the radio device 1A, to the radio devices 1B and 1C.

Subsequently in FIG. 9B, when the timers TMb and TMc expire individually, the distance calculators 16 of the radio devices 1B and 1C calculate the distance D (La5-Lb5) between the radio devices 1A and 1B and the distance D (La5-Lc5) between the radio devices 1A and 1C in steps S218 and S219.

In step S218, the distance calculator 16 of the radio device 1B detects that the distance D (La5-Lb5) exceeds 1000 m. The radio device 1B is in the temporary group call at the point of time of step S218, and accordingly, the temporary group participation/withdrawal controller 13 continues the participation in the temporary group without withdrawing the same. Unlike step S116 of FIG. 2B, the message transmission controller 11 of the radio device 1B does not control to transmit the temporary group withdrawal notification message to the radio device 1A.

Figure 11:
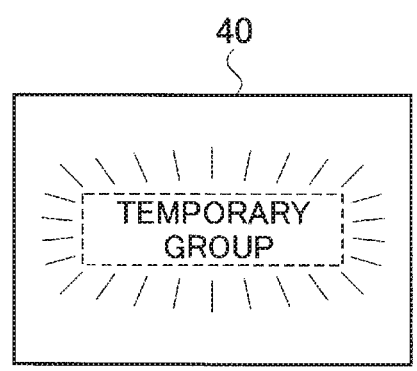
FIG. 11 is a diagram showing an example of a display state on the display when the radio device that is participating in the temporary group is remote from a group former's radio device by a predetermined distance.
Figure 12B:
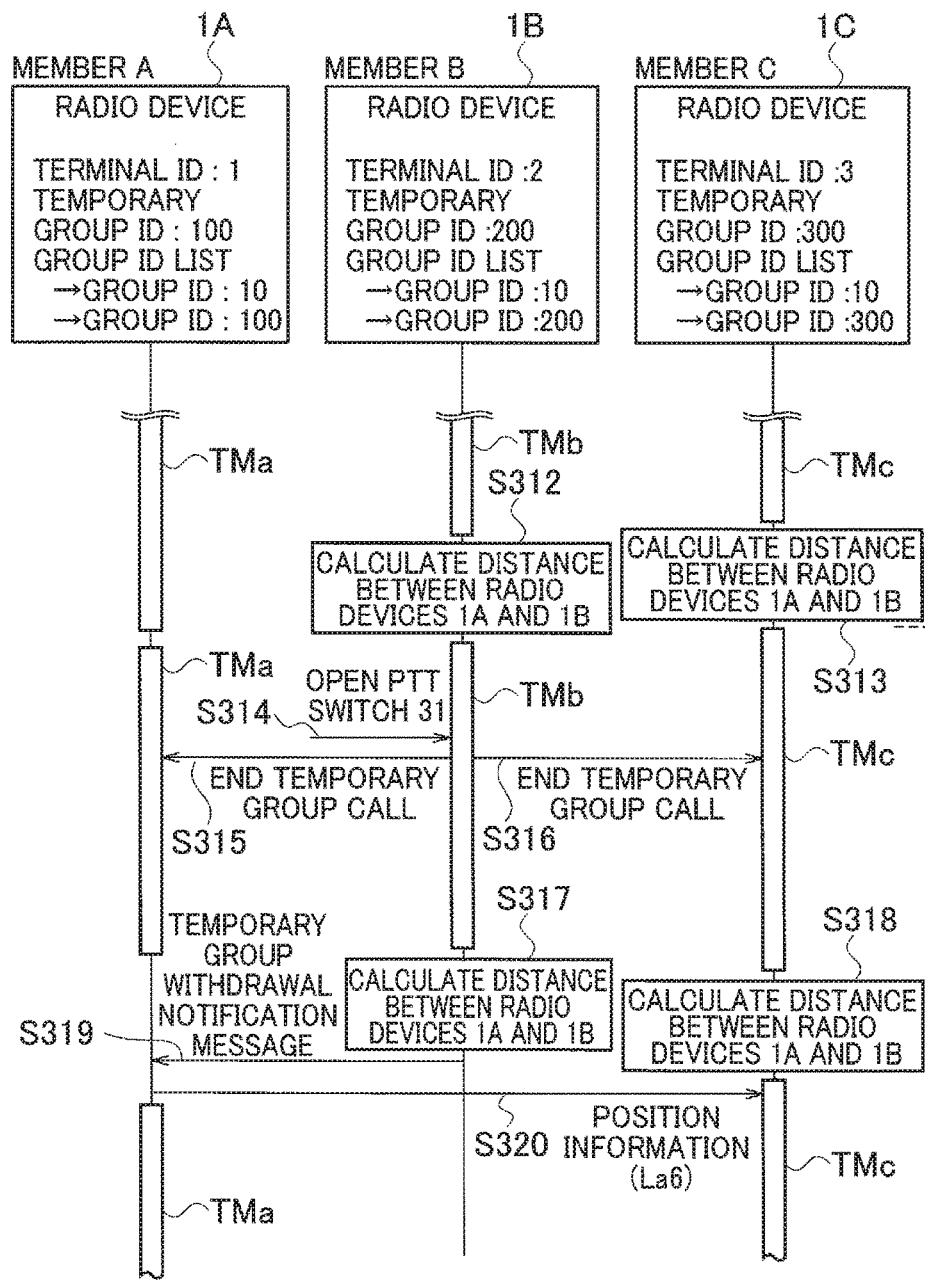

It is preferable that, upon detecting that the distances from the radio device 1A exceeds 1000 m during the temporary group call, for example, the distance calculators 16 of the radio devices 1B and 1C blink characters or an image, which indicates that the temporary group is now being formed, as shown in FIG. 11. In this way, the members B and C can recognize that the distances from the radio device 1A exceed 1000 m as the predetermined distance. In place of or in addition to the blink of the characters or the image, which indicates that the temporary group is now being formed, the color of the characters or the image may be changed.

Figure 10F:
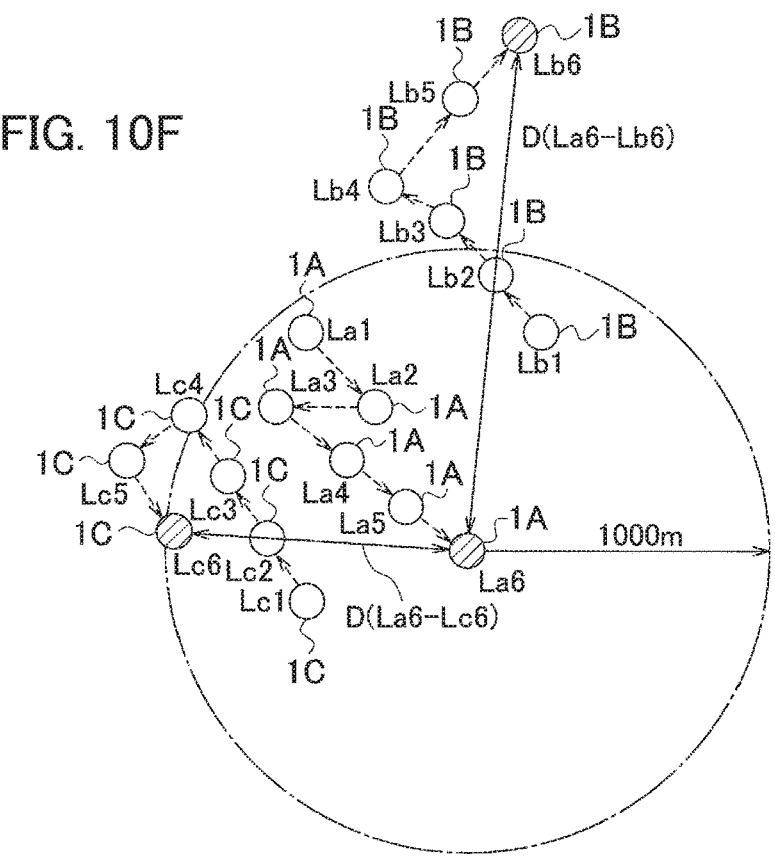
FIG. 10F is a view showing the positional relationship between the radio devices 1A to 1C on and after time t25 of FIG. 9B.

It is assumed that, as shown in FIG. 10F on and after time t24, the radio device 1A moves to a position the radio device 1B moves to a position Lb6, and the radio device 1C moves to a position Lc6.

In step S220, the member A opens the PTT switch 31. In steps S221 and S222, the radio device 1A ends the temporary group call, and in steps S223 and S224, transmits position information, which indicates the position La6 of the radio device 1A, to the radio devices 1B and 1C even when the timer TMa has not expired. The timer controller 14 of the radio device 1A activates the timer TMa when the radio device 1A transmits the position information.

When the timers TMb and TMc expire individually, the distance calculators 16 of the radio devices 1B and 1C calculate the distance D (La6-Lb6) between the radio devices 1A and 1B and the distance D (La6-Lb6) between the radio devices 1A and 1C in steps S225 and S226.

In step S225, the distance calculator 16 of the radio device 1B detects that the distance D (La6-Lb6) exceeds 1000 m. The temporary group participation/withdrawal controller 13 of the radio device 1B withdraws participation in the temporary group. In addition to this, in step S227, the message transmission controller 11 of the radio device 1B controls to transmit a temporary group withdrawal notification message to the radio device 1A. The distance (La6-Lc6) between the radio devices 1A and 1C is within 1000 m, and the temporary group by the radio devices 1A and 1C is continued.

<Third Sequence Example>

Next, referring to FIG. 12A, FIG. 12B, and FIGS. 13A to 13D, a description will be made of an operation when the member B as the group participant originates a call from the radio device 1B in order to talk with the members A and C in the case where the radio communication system forms the temporary group.

In FIG. 12A, it is assumed that the radio devices 1A to 1C are in such a positional relationship as shown in FIG. 10A until time t31. The radio devices 1B and 1C are located within a distance of 1000 m from the radio device 1A. By a similar operation to that in steps S101 to S105 of FIG. 2A, the radio device 1A transmits the registration request message and the position information of the radio device 1A to the radio devices 1B and 1C. In FIG. 12A, the radio devices 1B and 1C transmit a registration completion message to the radio device 1A, and the radio devices 1A to 1C form a temporary group.

It is assumed that, as shown in FIG. 10B, on and after time t31, the radio device 1A moves to the position La2, the radio device 1B moves to the position Lb2, and the radio device 1C moves to a position Lc2. When the timers TMb and TMc expire individually, the distance calculators 16 of the radio devices 1B and 1C calculate the distance between the radio devices 1A and 1B and the distance between the radio devices 1A and 1C in steps S301 and S302.

At this point in time, the radio devices 1B and 1C have not received position information indicating the new position La2 of the radio device 1A. Hence, in steps S301 and S302, the distance calculators 16 of the radio devices 1B and 1C calculate the distance D(La1-Lb2) between the radio devices 1A and 1B and the distance D(La1-Lc2) between the radio devices 1A and 1C.

When the timer TMa expires, then in steps S303 and S304, the radio device 1A transmits position information, which indicates the position La2 of the radio device 1A, to the radio devices 1B and 1C.

Figure 13A:
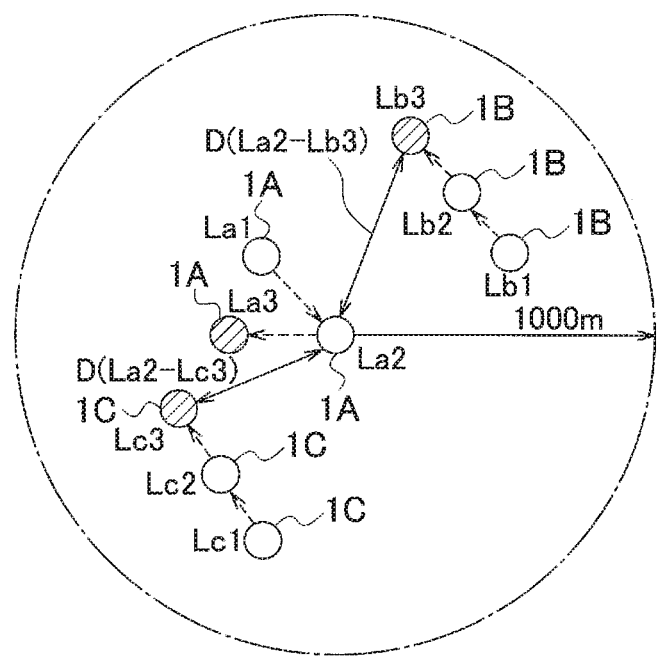
FIG. 13A is a view showing the positional relationship between the radio devices 1A to 1C during the period from time t32 until time t33 of FIG. 12A.

It is assumed that, as shown in FIG. 13A, on and after time t32, the radio device 1A moves to the position La3, the radio device 1B moves to the position Lb3, and the radio device 1C moves to the position Lc3. In step S305, the member B depresses a PTT switch 31 of the radio device 1B. Then, in steps S306 and S307, the radio device 1B starts a temporary group call, and transmits a voice signal to the radio devices 1A and 1C. While the member B continues to depress the PTT switch 31 of the radio device 1A, the temporary group call by the members A to C is continued.

During a period while the temporary group call by the members A to C is continued since the member B depresses the PTT switch 31 of the radio device 1B, a signal cannot be transmitted from the radio device 1A to the radio devices 1B and 1C. Hence, the radio device 2A does not transmit the position information of the radio device 1A even when the radio device 1A repeats the activation of the timer TMa and the timer TMa expires. The position of the radio device 1A, which is recognized by the radio devices 1B and 1C, remains unchanged to be the position La2.

In this way, when the group participant's radio device 1 (here, the radio device 1B or 1C) originates a call while the temporary group is being formed, the position information transmission controller 15 of the radio device 1A controls to stop the periodical transmission of the position information of the radio device 1A to the radio devices 1B and 1C during the period of the temporary group call.

When the timers TMb and TMc expire individually, the distance calculators 16 of the radio devices 1B and 1C calculate the distance D (La2-Lb3) between the radio devices 1A and 1B and the distance D (La2-Lc3) between the radio devices 1A and 1C in steps S308 and S309.

Figure 13B:
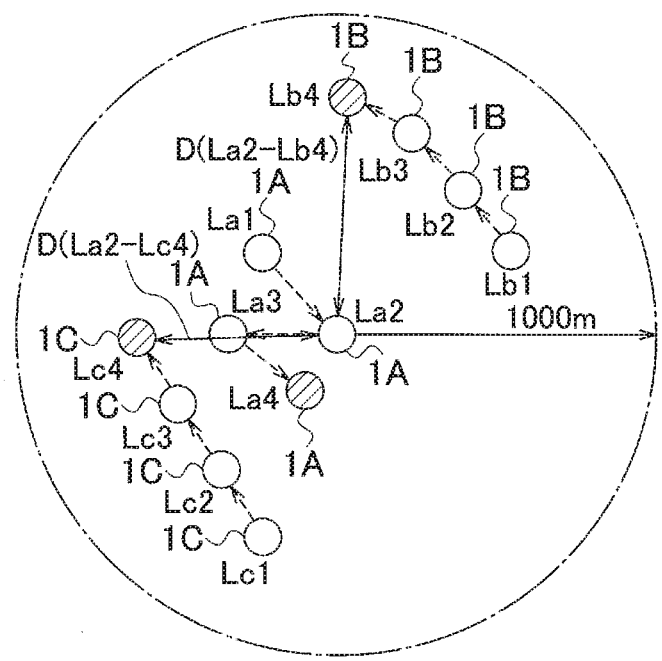
FIG. 13B is a view showing the positional relationship between the radio devices 1A to 1C during the period from time t33 until time t34 of FIG. 12A.

It is assumed that, as shown in FIG. 13B, on and after time t33, the radio device 1A moves to the position La4, the radio device 1B moves to the position Lb4, and the radio device 1C moves to the position Lc4. When the timers TMb and TMc expire individually, the distance calculators 16 of the radio devices 1B and 1C calculate the distance D (La2-Lb4) between the radio devices 1A and 1B and the distance D (La2-Lc4) between the radio devices 1A and 1C in steps S310 and S311.

Figure 13C:
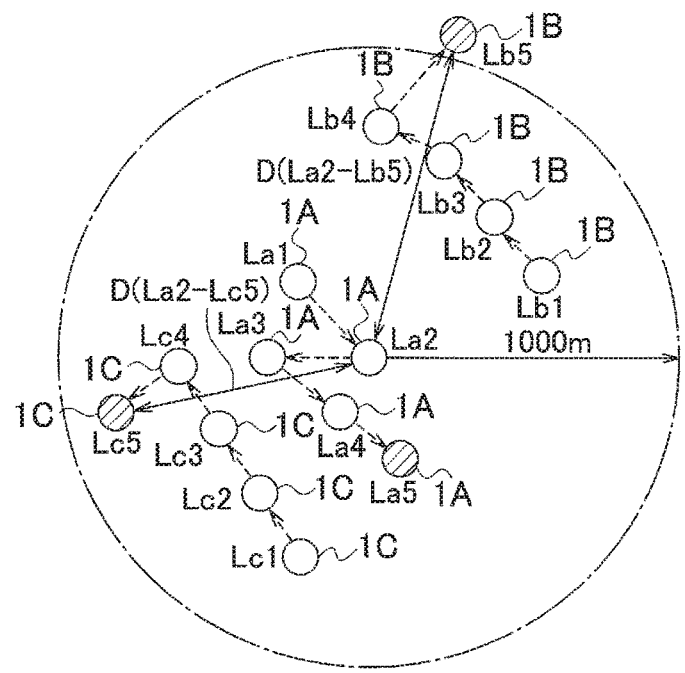
FIG. 13C is a view showing the positional relationship between the radio devices 1A to 1C during the period from time t34 of FIG. 12A until time t35 of FIG. 12B.

It is assumed that, as shown in FIG. 13C, on and after time t34, the radio device 1A moves to the position La5, the radio device 1B moves to the position Lb5, and the radio device 1C moves to the position Lc5. Subsequently in FIG. 12B, when the timers TMb and TMc expire individually, the distance calculators 16 of the radio devices 1B and 1C calculate the distance D (La2-Lb5) between the radio devices 1A and 1B and the distance D (La2-Lc5) between the radio devices 1A and 1C in steps S312 and S313.

As described above, based on the position information transmitted last from the radio device 1A (that is, the position information indicating the position La2 transmitted in steps S303 and S304), and based on the latest position information calculated by the position information calculator 70 of the radio devices 1B and 1C, the distance calculators 16 of the radio devices 1B and 1C calculate the distances between the radio devices 1A and 1B and the radio devices 1A and 1C, respectively.

As shown in FIG. 13C, the distance D (La2-Lb5) between the radio devices 1A and 1B exceeds 1000 m. Hence, in a similar way to the above, the radio device 1B blinks the characters or the image, which indicates that the temporary group is now being formed.

Figure 13D:
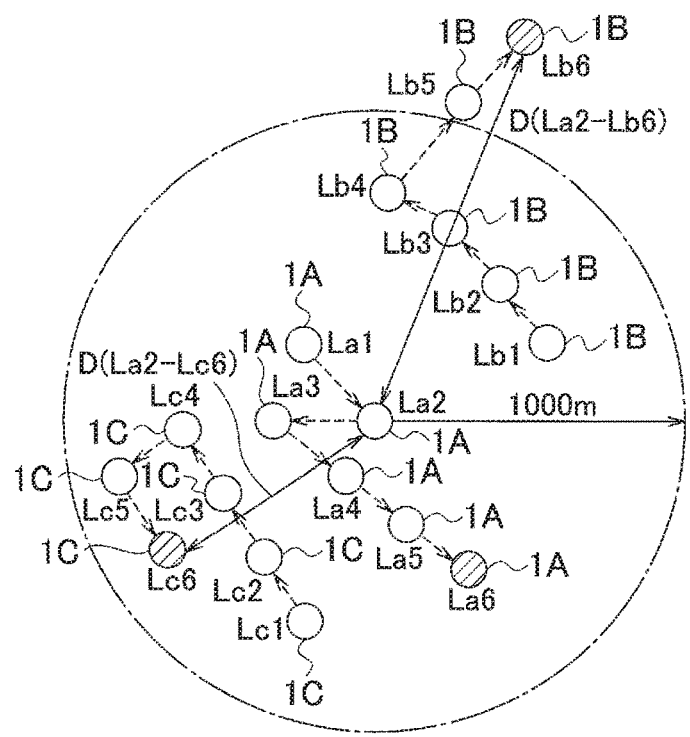
FIG. 13D is a view showing a positional relationship between the radio devices 1A to 1C on and after time t35 of FIG. 12B.

It is assumed that, as shown in FIG. 13D, on and after time t35, the radio device 1A moves to the position La6, the radio device 1B moves to the position Lb6, and the radio device 1C moves to the position Lc6.

In step S314, the member B opens the PTT switch 31. In steps S315 and S316, the radio device 1B ends the temporary group call. When the timers TMb and TMc expire individually, the distance calculators 16 of the radio devices 1B and 1C calculate the distance D (La2-Lb6) between the radio devices 1A and 1B and the distance D (La2-Lc6) between the radio devices 1A and 1C in steps S317 and S318.

In step S317, the distance calculator 16 of the radio device 1B detects that the distance D (La2-Lb6) exceeds 1000 m. The temporary group participation/withdrawal controller 13 of the radio device 1B withdraws participation in the temporary group. In addition to this, in step S319, the message transmission controller 11 of the radio device 1B controls to transmit the temporary group withdrawal notification message to the radio device 1A.

On and after steps S315 and S316, the temporary group call is ended, and accordingly, when the timer TMa expires, the radio device 1A transmits the position information, which indicates the position La6 of the radio device 1A, to the radio device 1C in step S320. On and after step S319, the temporary group by the radio devices 1A and 1C is continued.

As described above, in accordance with the radio communication system according to the embodiment, the temporary group can be created appropriately in consideration of the positions of the members who hold the radio devices.

The invention is not limited to the configuration of the above-described embodiment, and various modifications can be made without departing from the scope of the invention.

What is claimed is:

1. A radio communication system comprising:
a first radio device configured to promote formation of a temporary group; and
one or a plurality of second radio devices configured to respond to the promotion of the formation of the temporary group, wherein
the first radio device comprises:
a first position information calculator configured to calculate position information of the first radio device; and
a position information transmission controller configured to control to transmit the position information of the first radio device to the second radio devices at a time of promoting the formation of the temporary group,
each of the second radio devices comprises:
a second position information calculator configured to calculate position information of the second radio device;
a distance calculator configured to calculate a distance between the first and second radio devices based on the position information of the first radio device, the position information being transmitted from the first radio device, and based on the position information of the second radio device; and
a temporary group participation controller configured to control to participate in the temporary group when the distance between the first and second radio devices, the distance being calculated by the distance calculator based on the position information of the first radio device, the position information being transmitted from the first radio device at the time when the formation of the temporary group is promoted, and based on the position information of the second radio device, is within a predetermined distance, and the first radio device further comprises a temporary group formation controller configured to control to form a temporary group composed of the first radio device and at least one of the second radio devices, the at least one second radio device participating in the temporary group, when the at least one second radio device participates in the temporary group.

2. The radio communication system according to claim 1, wherein the position information transmission controller controls to periodically transmit the position information of the first radio device to the second radio device that is participating in the temporary group, the distance calculator periodically calculates the distance between the first and second radio devices, the second radio device further comprises a temporary group withdrawal controller configured to control to withdraw the participation in the temporary group when the distance between the first and second radio devices, the distance being calculated by the distance calculator based on the position information of the first radio device, the position information being transmitted from the first radio device, and based on the position information of the second radio device, exceeds the predetermined distance, and the first radio device further comprises a temporary group cancellation controller configured to control to cancel the temporary group when all of the second radio devices which are participating in the temporary group withdraw the participation in the temporary group.

3. The radio communication system according to claim 2, wherein the distance calculator calculates the distance between the first and second radio devices based on position information transmitted last from the first radio device and latest position information calculated by the second position information calculator.

4. The radio communication system according to claim 2, wherein, even when the distance between the first and second radio devices forming the temporary group, the distance being calculated by the distance calculator based on the position information of the first radio device, the position information being transmitted from the first radio device, and on the position information of the second radio device, exceeds the predetermined distance during a period of a temporary group call originated by either of the first and second radio devices, the temporary group withdrawal controller does not control to withdraw the participation in the temporary group, but controls to continue the participation in the temporary group.

5. The radio communication system according to claim 2, wherein, during a period of a temporary group call originated by the first radio device forming the temporary group, the first radio device periodically superimposes the position information of the first radio device on a voice signal transmitted to the second radio device.

6. The radio communication system according to claim 2, wherein the position information transmission controller transmits latest position information of the first radio device to the second radio device when the first radio device ends a temporary group call.

7. The radio communication system according to claim 2, wherein the position information transmission controller stops the periodical transmission of the position information of the first radio device to the second radio device during a period of a temporary group call originated by the second radio device forming the temporary group, and the distance calculator calculates the distance between the first and second radio devices based on position information transmitted last from the first radio device and latest position information calculated by the second position information calculator.

* * * * *